Sept. 4, 1951 G. J. WOREL 2,566,591
PISTON EXPANDER-SHELL DRIVE-IN TYPE
Filed April 28, 1949
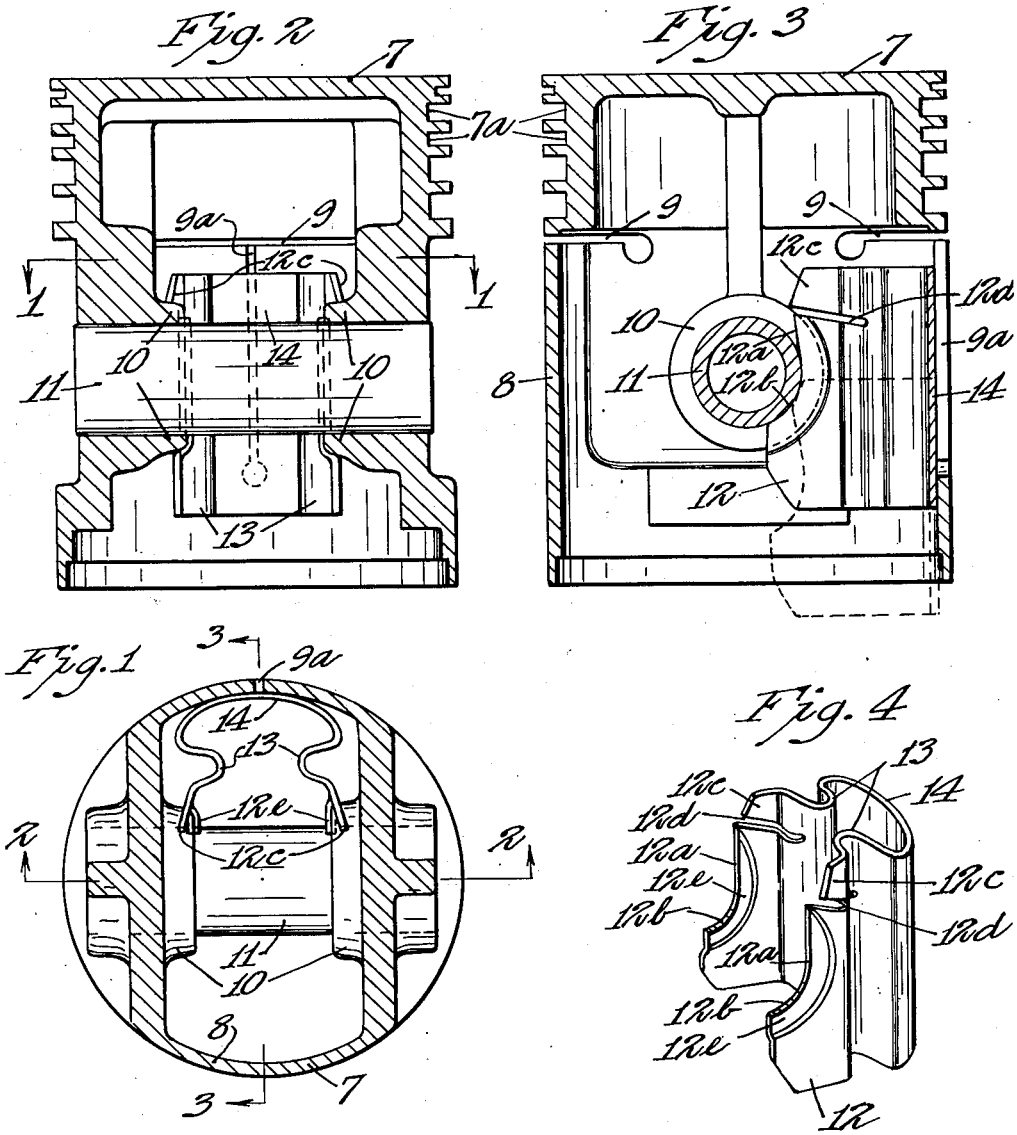
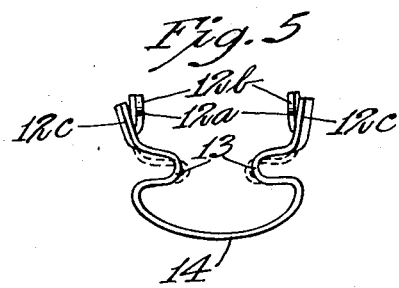
Inventor
Glen J. Worel
By Williamson & Williamson
Attorneys Patented Sept. 4, 1951

2,566,591

UNITED STATES PATENT OFFICE 2,566,591

PISTON EXPANDER—SHELL DRIVE-IN TYPE

Glen J. Worel, Minneapolis, Minn., assignor to Thexton Manufacturing Company, Minneapolis, Minn., a corporation of Minnesota Application April 28, 1949, Serial No. 90,155

6 Claims. (Cl. 309—12)

This invention relates to expanders for the skirts of pistons of internal combustion engines, and particularly to an expander adapted for pistons having relatively short wrist pin bosses, for example, those used in the engines produced by Ford Motor Company, Buick Division of General Motors Corporation and Dodge Division of Chrysler Corporation.

When the cylinders of internal combustion engines become worn they become out-of-round, and the skirts of the pistons tend to slap against the cylinder walls and produce a tilting of the pistons during their working strokes. This quickly wears the edges of the oil rings and greatly decreases the efficiency of the engine.

Piston expanders which have been applied to the interiors of the resilient piston skirts, have been used extensively heretofore. Some have been of the leaf spring or "shell" type, wherein the resilient piston expander was interposed between the wrist pin or the wrist pin bosses and the interior peripheral wall of the piston skirt, exerting an outward pressure on a portion of the skirt disposed intermediately of the wrist pin bosses. Examples of such "shell" type expanders are disclosed in my United States Letters Patent No. 2,355,937, granted August 15, 1944, and 2,442,834 granted June 8, 1948.

Shell type expanders of this general type have, for the most part, been interposed between the relatively elongated wrist pin bosses and the piston skirt, the expanders having legs whose extremities bear against the wrist pin bosses. In such constructions, insertion of the expander has been facilitated by spreading the legs with a pliers or other suitable tool, thereby decreasing the overall height of the same and making installation easy.

With several types of piston constructions now extensively utilized, the wrist pin bosses are so short that adequate spreading of the legs of the expander to facilitate insertion is impossible.

In my Patent No. 2,463,667 granted March 8, 1949, I have disclosed means whereby the piston skirt can be expanded with a structure which can be quickly driven into place from the lower open end of the piston, and wherein the expander is in engagement with the ends of the wrist pin bosses. This expander is so designed that it will not cause overexpansion of the piston skirt, and means is provided for compensating for expansion and contraction of the piston through wide temperature variations.

The present invention has as an object the provision of a piston expander of the "drive-in" type which can be made to engage either the wrist pin or its bosses, with the further provision of means whereby the expander is firmly locked in position and cannot back out of the piston.

Another object of the invention is to provide a piston expander of the type set forth above, wherein the locking means is designed to engage the end portion of the wrist pin boss at one or both sides of the piston.

A further object of the invention is to provide an expander of the "drive-in" type with locking means which can be installed with approximately the same facility as one without the locking feature.

The above and other objects and advantages of the invention will more fully appear from the following description made in connection with the accompanying drawings, wherein like reference characters refer to the same parts throughout the views, and, in which:

Fig. 1 is a sectional view taken on line 1—1 of Fig. 2, of a piston of the "short wrist pin boss" type, having an embodiment of my invention applied thereto;

Fig. 2 is a vertical section taken on the line 2—2 of Fig. 1;

Fig. 3 is a vertical section taken on the line 3—3 of Fig. 1, the dotted lines indicating the position of the expander before being driven into place;

Fig. 4 is a perspective view showing an embodiment of the expander per se, and

Fig. 5 is an end view of the expander.

In the drawings there is shown a piston 6 having the usual head 7. The upper side wall of the piston is provided with the usual piston ring grooves 7a. The head, in conventional fashion, is of greater thickness than the depending skirt 8, which is continuous and integral with the head, and is outwardly and circumferentially offset somewhat from the inner periphery of the head. The skirt 8, in the type shown, is constructed of resilient, somewhat flexible material and may have a T-slot therein. This slot includes a circumferential portion 9 extending through the greater portion of the upper part of the skirt and intersected by a vertical slot 9a, which is disposed intermediate of the wrist pin bosses 10. The lower portion of the skirt is not slotted as in some other types of pistons.

The usual short type of wrist pin boss 10 is of heavy construction and is integrally formed with the inner walls of the skirt 8. They are bored and smoothly ground to act as bearings for the wrist pin 11.

My improved expander is adapted to apply pressure and expand the portion of the piston skirt extending about the slots 9 and 9a intermediately of the wrist pin bosses 10 and at one side of the piston. My expander is equally applicable to slotted or unslotted pistons and is particularly conceived for installation and operation upon a piston where litle space is provided between opposing struts or walls from which the wrist pin bosses protrude.

The structure comprises a relatively wide shell or leaf spring member curved into the general shape of a U in cross section, and having relatively wide leg portions 12, which extend in substantially parallel relationship from inwardly folded temperature compensation portions 13. The article is preferably constructed from comparatively thin spring sheet metal or its equivalent, and after shaping is tempered.

The device is shaped to form a convex, medial pressure-applying area or zone 14 which preferably is the full width of the expander, and is adapted to lie against the inner wall of the piston skirt at an area intermediate of the wrist pin connections. The two temperature compensation folds 13 are disposed intermediately of the pressure-applying portions 14. The longitudinal edges of the legs 12, and said folds are opposed and extend parallel with the longitudinal center line of the pressure-applying portion.

Portions of the end edges of the legs 12 are relatively straight as at 12a and in parallel relation to the pressure-applying portion 14. These edges then continue in curved portions 12b which are adapted to conform approximately to the circumference of the wrist pin 11 and to be seated against the lower side of the wrist pin.

Immediately in front of, or above the beginning of the straight portions 12a are tongues or tooth-like members 12c, formed by cutting slots 12d in the legs 12. It should be noted that these tooth-like members 12c lie at an angle to the general planes of the legs 12, being disposed outwardly from the slots 12d, and they also terminate a short distance above the straight edge portions 12a.

Furthermore, the intermediate portions of the ends of the legs 12 are provided with recesses 12e of arcuate shape which are adapted to conform to the shape of the wrist pin bosses 10 and to be seated against the lower side of the wrist pin bosses.

The offset or recessed portions 12e nicely fit the extremities of the wrist pin bosses 10, whereby, when the expander is sprung into place, they will seat snugly against the bosses. At the same time the tooth-like members 12c will expand or spring away from each other and their relatively sharp corners and edges will bite into the metal of the wrist pin bosses and firmly anchor the expander against accidental displacement. The curved portions 12b prevent the expander from being driven too far into the piston and the tooth-like elements 12c keep the expander from backing out. Thus it will be seen that while the device is relatively easy to install, it will automatically lock itself into position.

In installation, the legs 12 are sprung slightly towards each other and the expander is inserted upwardly from the dotted line position of Fig. 3. The inclined portions 12a of the legs contact the wrist pin with a wedging action, and as the expander is driven into position, it will flex as shown in Fig. 5 in dotted lines. When in position, the wrist pin bosses will seat in the recesses 12e and the tooth-like members 12c will expand into their locking positions described above.

In the insertion of the expander, the skirt is not subjected to any undue expansion beyond that desired by reason of the tapering of the legs at 12a and also due to the fact that the legs of the device are flexed inwardly through the provision of the intermediate folds 13. When the recessed portions slip into position relative to the bosses of the piston, the material which forms said recesses furnish thrust applying seats so that undue wear is not placed on the wrist pins by reason of the engagement of the edges of the legs with the wrist pin. In other words, when seated, not only do the extreme edges of the expander legs engage the wrist pin, but a base of resistance is provided by the extremities of the wrist pin bosses 10 through the engagement of the arcuate, shouldered recesses 12e of the legs.

The opposed, inwardly extending intermediate folds 13 in my expander provide an efficient means for insuring proper functioning of the expander regardless of expansion and contraction of the piston parts due to wide temperature variations during the operation of the engine. The walls and wrist pin bosses of the piston are usually constructed from alloys having a co-efficient of expansion considerably greater than spring steel from which the expander is constructed. Thus, unless provision is made for compensation for such expansion during the range of temperatures present in normal internal combustion engines from starting point to operation at high speed, considerably greater pressure on the piston skirt would be applied when the temperature is materially raised. This compensation is made through the intermediate folds 13. They are so constructed that substantially the same pressure is applied to the piston skirt with these variations of temperature.

The important and about the only difference between the devices disclosed herein and in the above mentioned Patent No. 2,463,667, is the provision herein of the locking means in the form of the tooth-like elements 12c. The expander functions in the same manner, but the present construction provides a positive lock in addition to the securing function secured with the side walls of the recesses 12e.

It will, of course, be understood that various changes may be made in the form, details, arrangement and proportions of the various parts without departing from the scope of my invention.

What I claim is:

1. A piston expander for an internal combustion engine piston of the type having opposed, substantially cylindrical wrist pin bosses, a cylindrical wrist pin journaled therein and an annular, depending piston skirt of resilient material comprising; a generally U-shaped resilient body having legs of considerable width, said legs having indented portions shaped to fit at least partially about the wrist pin bosses, and at least one of said legs having its upper end portion split to form a tooth-like member, said tooth-like member being bent laterally and adapted to engage the wrist pin boss in cooperation with the adjacent indented portion of said leg to positively prevent displacement of the expander.

2. A piston expander for an internal combustion engine piston of the type having opposed, substantially cylindrical wrist pin bosses, a cylindrical wrist pin journaled therein and an annular, depending piston skirt of resilient material comprising; a resilient body having a pair of legs and a connecting portion, said legs having portions offset from their general planes and providing wrist pin boss-receiving bights, and at least one of said legs having an inwardly extending slot formed in one of its end portions and having a part thereof adjacent said slot bent laterally to positively engage the adjacent wrist pin boss whereby displacement of the expander in at least one direction may be positively precluded.

3. The structure in claim 2, and said laterally bent part being resiliently shiftable relative to the leg by which it is carried.

4. A piston expander for an internal combustion engine piston of the type having opposed, substantially cylindrical wrist pin bosses, a cylindrical wrist pin journaled therein and an annular, depending piston skirt of resilient material comprising; a resilient body having a pair of legs and a connecting portion, said legs having outer end portions shaped to fit partially about the wrist pin bosses, said connecting portion being located to apply pressure against the resilient skirt of a piston, and at least one of said legs having a slotted end portion a part of which extends laterally, said laterally extending part being adapted to positively engage the adjacent wrist pin boss and to cooperate with the adjacent boss fitting end portion to positively prevent longitudinal movement of the expander relative to the skirt.

5. A piston expander for an internal combustion engine piston of the type having opposed, substantially cylindrical wrist pin bosses, a cylindrical wrist pin journaled therein and an annular, depending piston skirt of resilient material comprising; a generally U-shaped resilient body having legs of considerable width, said legs having indented portions shaped to fit at least partially about the wrist pin bosses, and at least one of said legs having one of its end portions slotted and having at least a part of said slotted end portion bent laterally to positively engage the adjacent boss to prevent movement of the expander relative to the skirt in at least one direction.

6. A piston expander for an internal combustion engine piston of the type having opposed, substantially cylindrical wrist pin bosses, a cylindrical wrist pin journaled therein and an annular, depending piston skirt of resilient material comprising; a generally U-shaped resilient body having legs of considerable width, at least one of said legs having a surface adapted to register with the adjacent wrist pin boss when the expander is positioned for operation to prevent movement of the expander in one direction and at least one of said legs having one of its end portions slotted and having at least a part of said slotted end portion bent laterally to positively engage the adjacent boss whereby movement of the expander relative to the skirt in the opposite direction may be prevented.

GLEN J. WOREL.

REFERENCES CITED

The following references are of record in the file of this patent:

UNITED STATES PATENTS

| Number | Name | Date |
|---|---|---|
| 1,958,154 | Six | May 8, 1934 |
| 2,034,005 | Six | Mar. 17, 1936 |
| 2,119,137 | Moore | May 31, 1938 |
| 2,286,858 | Knoebel | June 16, 1942 |
| 2,383,893 | Six | Aug. 28, 1945 |